(12) United States Patent
Ye et al.

(10) Patent No.: US 11,557,062 B2
(45) Date of Patent: Jan. 17, 2023

(54) METHOD AND APPARATUS FOR PROCESSING VIDEO FRAME

(71) Applicant: BEIJING BAIDU NETCOM SCIENCE AND TECHNOLOGY CO., LTD., Beijing (CN)

(72) Inventors: Xiaoqing Ye, Beijing (CN); Xiao Tan, Beijing (CN); Hao Sun, Beijing (CN); Hongwu Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 114 days.

(21) Appl. No.: 17/172,883

(22) Filed: Feb. 10, 2021

(65) Prior Publication Data

US 2021/0335008 A1 Oct. 28, 2021

(30) Foreign Application Priority Data

Apr. 27, 2020 (CN) .......................... 202010341669.2

(51) Int. Cl.
*G06T 7/80* (2017.01)
*G06T 5/00* (2006.01)

(52) U.S. Cl.
CPC ................ *G06T 7/80* (2017.01); *G06T 5/006* (2013.01); *G06T 2207/10016* (2013.01)

(58) Field of Classification Search
CPC .. G06T 7/80; G06T 5/006; G06T 2207/10016
See application file for complete search history.

(56) References Cited

U.S. PATENT DOCUMENTS

| 7,171,056 B2* | 1/2007 | Zhang | G06T 5/006 382/266 |
| 7,912,317 B2* | 3/2011 | Souchard | G06T 5/006 348/241 |

(Continued)

FOREIGN PATENT DOCUMENTS

| JP | 2009-140066 A | 6/2009 |
| JP | 2011-185753 A | 9/2011 |

(Continued)

OTHER PUBLICATIONS

Extended European Search Report for European Application No. 21158600.3, dated Dec. 3, 2021, 9 pages.

(Continued)

*Primary Examiner* — Brian P Yenke
(74) *Attorney, Agent, or Firm* — Seed IP Law Group LLP (57) ABSTRACT

Embodiments of the present disclosure provide a method and apparatus for processing a video frame, and relates to the field of computer vision technology. The method may include: acquiring a plurality of candidate first-order radial distortion parameters preset for a to-be-processed video frame, and acquiring a specified value of a specified radial distortion parameter; performing radial distortion correction on the to-be-processed video frame to obtain a first initial corrected video frame; selecting a first initial corrected video frame in which a local region except for a center region after distortion correction includes a largest number of straight line segments; and determining a candidate first-order radial distortion parameter corresponding to the selected first initial corrected video frame for use as a target first-order radial distortion parameter of the to-be-processed video frame.

18 Claims, 5 Drawing Sheets

(56) References Cited

U.S. PATENT DOCUMENTS

| | | | | |
|---|---|---|---|---|
| 8,786,680 | B2* | 7/2014 | Shiratori | G06V 40/23 |
| | | | | 345/473 |
| 9,930,463 | B2* | 3/2018 | Little | H04R 29/007 |
| 10,169,665 | B1* | 1/2019 | Zhang | G06K 9/6201 |
| 10,382,680 | B2* | 8/2019 | Polavarapu | G11B 27/10 |
| 10,645,290 | B2* | 5/2020 | Besley | G06T 5/003 |
| 10,863,112 | B1* | 12/2020 | He | H04N 5/23238 |
| 11,122,195 | B2* | 9/2021 | Ikeda | G06T 3/0062 |
| 11,151,746 | B2* | 10/2021 | Walls | H04N 17/002 |
| 11,373,335 | B2* | 6/2022 | Ikeda | G06T 7/80 |
| 2010/0033567 | A1* | 2/2010 | Gupta | H04N 17/002 |
| | | | | 348/E17.001 |
| 2013/0135474 | A1* | 5/2013 | Sakano | G06T 7/80 |
| | | | | 348/148 |
| 2015/0199798 | A1* | 7/2015 | Mehta | G06T 3/0006 |
| | | | | 382/275 |
| 2016/0295131 | A1* | 10/2016 | Hjelmstrom | H04N 5/217 |
| 2019/0028688 | A1* | 1/2019 | Kumar | H04N 13/246 |
| 2019/0102910 | A1* | 4/2019 | Kaneko | G06T 7/12 |
| 2020/0134789 | A1* | 4/2020 | Paik | G06T 5/006 |
| 2020/0234467 | A1* | 7/2020 | Tran | G06N 3/0454 |
| 2020/0294269 | A1* | 9/2020 | Tezaur | G06T 5/006 |
| 2021/0051317 | A1* | 2/2021 | Yan | G06T 7/80 |
| 2021/0279473 | A1* | 9/2021 | Wu | G06T 7/00 |
| 2021/0279845 | A1* | 9/2021 | Feng | G06T 5/006 |
| 2021/0333302 | A1* | 10/2021 | Ma | G05D 1/0094 |
| 2021/0407132 | A1* | 12/2021 | Su | G01B 11/00 |
| 2022/0027639 | A1* | 1/2022 | Li | G06V 20/58 |
| 2022/0044443 | A1* | 2/2022 | Su | G06T 7/80 |
| 2022/0076388 | A1* | 3/2022 | Nakano | H04N 5/217 |
| 2022/0148223 | A1* | 5/2022 | Geissler | G06T 7/20 |
| 2022/0182595 | A1* | 6/2022 | Han | G06T 7/292 |
| 2022/0198710 | A1* | 6/2022 | Kuang | G06T 7/80 |

FOREIGN PATENT DOCUMENTS

| | | |
|---|---|---|
| JP | 2015-088029 A | 5/2015 |
| JP | 2016-197856 A | 11/2016 |
| JP | 2018-059767 A | 4/2018 |
| KR | 10-0668073 B1 | 1/2007 |
| WO | 2011/161746 A1 | 12/2011 |

OTHER PUBLICATIONS

Fry et al., "A System and Method for Auto-Correction of First Order Lens Distortion," Applied Imagery Pattern Recognition Workshop (AIPR), Oct. 13, 2010, pp. 1-4.

Lee et al., "Correction of Barrel Distortion in Fisheye Lens Images Using Image-Based Estimation of Distortion," IEEE Access, Apr. 1, 2019, pp. 45723-45733.

Wang et al., "A Simple Method of Radial Distortion Correction with Centre of Distortion Estimation," J Math Imaging Vis (2009) 35: 165-172.

Zhu et al., "Distortion correction method of a zoom lens based on the vanishing point geometric constraint," Measurement Science and Technology 30 (2019), 12 pages.

* cited by examiner

Fig. 6

METHOD AND APPARATUS FOR PROCESSING VIDEO FRAME

CROSS-REFERENCE TO RELATED APPLICATIONS

This application claims priority to Chinese Patent Application No. 202010341669.2, filed on Apr. 27, 2020, titled "Method and apparatus for processing video frame," which is hereby incorporated by reference in its entirety.

TECHNICAL FIELD

The present disclosure relates to the field of computer technology, specifically to the field of computer vision technology, and more specifically to a method and apparatus for processing a video frame.

BACKGROUND

Image distortion, also known as lens distortion, is a generic term for inherent perspective distortion of optical lenses, i.e., perspective-caused distortion. An obvious distortion will arise from images captured in many scenarios, e.g., an image captured using a wide-angle lens or an image captured remotely. In the case of distortion, an object in an image has greater deformation relative to the real object. This will not only affect the beauty and recognition of the image, but also cause some obstacles to subsequent image processing such as image detection.

SUMMARY

A method and apparatus for processing a video frame, an electronic device and a storage medium are provided.

According to a first aspect, an embodiment of the present disclosure provides a method for processing a video frame, including: acquiring a plurality of candidate first-order radial distortion parameters preset for a to-be-processed video frame, and acquiring a specified value of a specified radial distortion parameter, where an absolute value of the specified value is less than or equal to an absolute value of each of the candidate first-order radial distortion parameters, and the specified radial distortion parameter is a non-first-order radial distortion parameter; performing, for each of the candidate first-order radial distortion parameters, radial distortion correction on the to-be-processed video frame based on the each candidate first-order radial distortion parameter and the specified value, to obtain a first initial corrected video frame; selecting, from the first initial corrected video frames, a first initial corrected video frame in which at least a local region comprises a largest number of straight line segments, wherein at least local regions corresponding to the first initial corrected video frames are consistent; and determining a candidate first-order radial distortion parameter corresponding to the selected first initial corrected video frame for use as a target first-order radial distortion parameter of the to-be-processed video frame.

According to a second aspect, an embodiment of the present disclosure provides an apparatus for processing a video frame, including: a first acquiring unit configured to acquire a plurality of candidate first-order radial distortion parameters preset for a to-be-processed video frame, and acquire a specified value of a specified radial distortion parameter, where an absolute value of the specified value is less than or equal to an absolute value of each of the candidate first-order radial distortion parameters, and the specified radial distortion parameter being a non-first-order radial distortion parameter; a first correcting unit configured to perform, for each of the candidate first-order radial distortion parameters, radial distortion correction on the to-be-processed video frame based on the each candidate first-order radial distortion parameter and the specified value, to obtain a first initial corrected video frame; a selecting unit configured to select, from the first initial corrected video frames, a first initial corrected video frame in which at least a local region comprises a largest number of straight line segments, wherein at least local regions corresponding to the first initial corrected video frames are consistent; and a determining unit configured to determine a candidate first-order radial distortion parameter corresponding to the selected first initial corrected video frame for use as a target first-order radial distortion parameter of the to-be-processed video frame.

According to a third aspect, an embodiment of the present disclosure provides an electronic device, including: one or more processors; and a storing apparatus configured to store one or more programs. The one or more programs, when executed by the one or more processors, cause the one or more processors to implement the method of any embodiment in embodiments of the method for processing a video frame.

According to a fourth aspect, an embodiment of the present disclosure provides a computer-readable storage medium, storing a computer program thereon. The program, when executed by a processor, implements the method of any embodiment in embodiments of the method for processing a video frame.

BRIEF DESCRIPTION OF THE DRAWINGS

After reading detailed descriptions of non-limiting embodiments with reference to following accompanying drawings, other features, objectives, and advantages of the present disclosure will become more apparent.

DETAILED DESCRIPTION OF EMBODIMENTS

Example embodiments of the present disclosure are described below with reference to accompanying drawings, including various details of embodiments of the present disclosure to contribute to understanding, which should be considered merely as examples. Therefore, those of ordinary skills in the art should realize that various alterations and modifications can be made to the embodiments described here without departing from the scope and spirit of the present disclosure. Similarly, for clearness and conciseness, descriptions of well-known functionalities and structures are omitted in the following description.

It should be noted that the embodiments in the present disclosure and the features in the embodiments may be combined with each other on a non-conflict basis. The present disclosure will be described in detail below with reference to the accompanying drawings and in combination with the embodiments.

Figure 1:
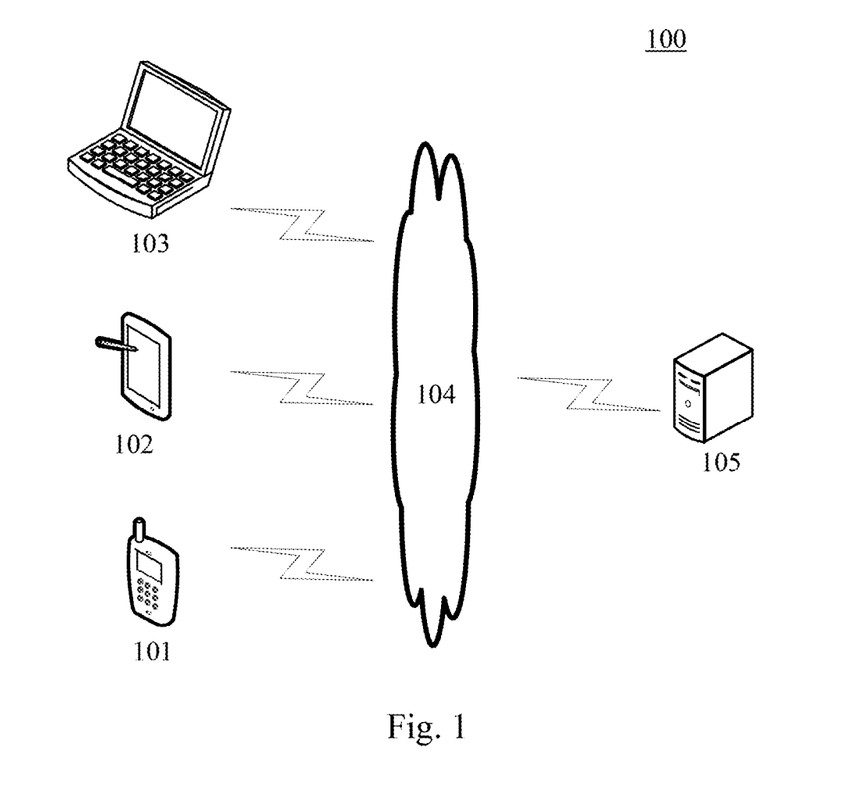
FIG. 1 is an architectural diagram of an example system in which some embodiments of the present disclosure may be implemented.

FIG. 1 shows an example system architecture 100 in which embodiments of a method for processing a video frame or an apparatus for processing a video frame of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, e.g., to receive or send a message. The terminal devices 101, 102, and 103 may be provided with various communication client applications, such as a video application, a live broadcast application, an instant messaging tool, an email client, and social platform software.

The terminal devices 101, 102, and 103 here may be hardware, or may be software. When the terminal devices 101, 102, and 103 are hardware, the terminal devices may be various electronic devices with a display screen, including but not limited to a smart phone, a tablet computer, an ebook reader, a laptop portable computer, a desktop computer, and the like. When the terminal devices 101, 102, and 103 are software, the terminal devices may be installed in the above-listed electronic devices, may be implemented as a plurality of software programs or software modules (e.g., a plurality of software programs or software modules configured to provide distributed services), or may be implemented as a single software program or software module. This is not specifically limited here.

The server 105 may be a server providing various services, such as a backend server providing support for the terminal devices 101, 102, and 103. The backend server can process, e.g., analyze, data, such as a received to-be-processed video frame, and return the processing result (e.g., a target first-order radial distortion parameter) to the terminal devices.

It should be noted that the method for processing a video frame provided in embodiments of the present disclosure may be executed by the server 105 or the terminal devices 101, 102, and 103. Accordingly, the apparatus for processing a video frame may be provided in the server 105 or the terminal devices 101, 102, and 103.

It should be understood that the numbers of terminal devices, networks, and servers in FIG. 1 are merely illustrative. Any number of terminal devices, networks, and servers may be provided based on actual requirements.

Figure 2:
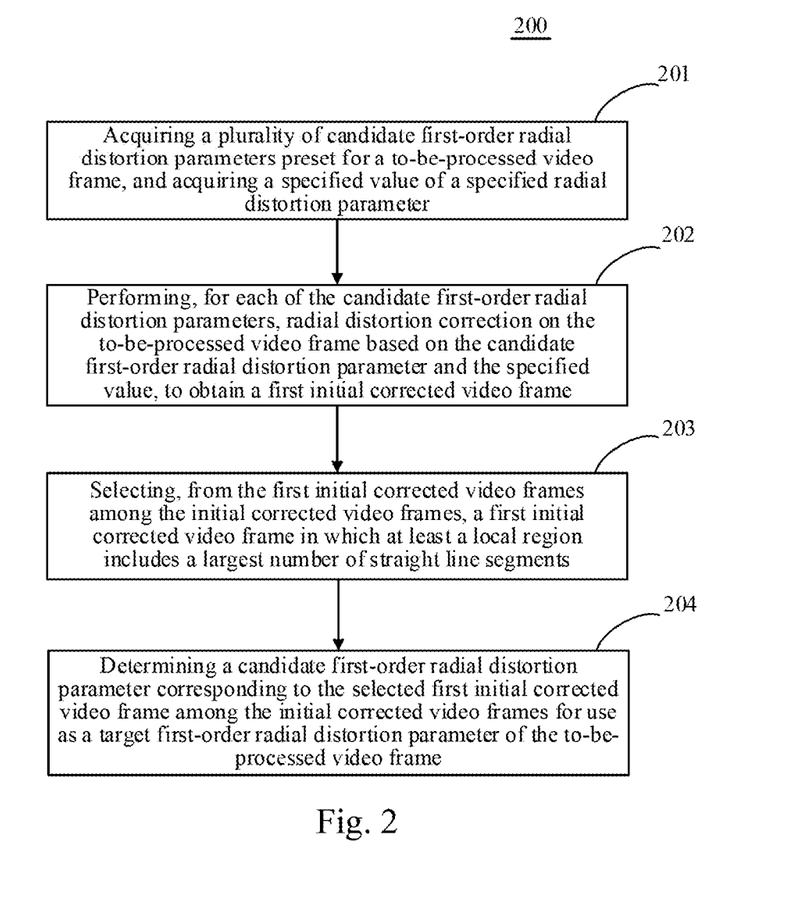
FIG. 2 is a flowchart of a method for processing a video frame according to an embodiment of the present disclosure.

Further referring to FIG. 2, a process 200 of the method for processing a video frame according to an embodiment of the present disclosure is shown. The method for processing a video frame includes the following steps.

Step 201: acquiring a plurality of candidate first-order radial distortion parameters preset for a to-be-processed video frame, and acquiring a specified value of a specified radial distortion parameter. An absolute value of the specified value is less than or equal to an absolute value of each of the candidate first-order radial distortion parameters, the specified radial distortion parameter is a non-first-order radial distortion parameter.

In the present embodiment, an executing body (e.g., the server or the terminal device shown in FIG. 1) on which the method for processing a video frame runs may acquire a plurality of candidate first-order radial distortion parameters (i.e., $k_1$) preset for the to-be-processed video frame. In addition, the executing body may further acquire, for a specified radial distortion parameter other than the first-order radial distortion parameters, a specified value of the specified radial distortion parameter. In practice, the executing body may directly acquire the preset plurality of candidate first-order radial distortion parameters and the specified value locally or from other electronic devices. The to-be-processed video frame here may refer to an original video frame image captured using a camera, or may refer to a video frame obtained by certain processing (e.g., screenshot, or style transformation) of an original video frame image.

The radial distortion parameter may include a plurality of radial distortion parameters, such as a first-order radial distortion parameter, and a second-order radial distortion parameter ($k_2$), and may further include a third-order radial distortion parameter ($k_3$). Accordingly, the specified radial distortion parameter here may include a second-order radial distortion parameter, and may further include a third-order radial distortion parameter. Each specified radial distortion parameter has its corresponding specified value. Values of different specified radial distortion parameters may alternatively be identical, e.g., may all be 0.

For example, a specified value is 0, and its absolute value is 0; a candidate first-order radial distortion parameter is −0.2, and its absolute value is 0.2, which is greater than the absolute value of the specified value.

Step 202: performing, for each of the candidate first-order radial distortion parameters, radial distortion correction on the to-be-processed video frame based on the candidate first-order radial distortion parameter and the specified value, to obtain a first initial corrected video frame.

In the present embodiment, the executing body may perform, for each candidate first-order radial distortion parameter, radial distortion correction on the to-be-processed video frame based on the candidate first-order radial distortion parameter and the specified value of each specified radial distortion parameter, and the radial distortion correction result is the first initial corrected video frame. In practice, the executing body may use a specified focal length as a radial distortion correction parameter to perform the above radial distortion correction.

Step 203: selecting, from first initial corrected video frames, a first initial corrected video frame in which at least a local region includes a largest number of straight line segments. Here, at least local regions corresponding to the respective first initial corrected video frames are consistent.

In the present embodiment, the executing body may execute the selecting step, i.e., selecting, from the obtained first initial corrected video frames, the first initial corrected video frame in which at least local region includes the largest number of straight line segments. The at least local region in the first initial corrected video frame refers to a local region or all regions of the first initial corrected video frame. At least local regions corresponding to different first initial corrected video frames are consistent. The straight line segment here refers to an unbent line segment.

Step 204: determining a candidate first-order radial distortion parameter corresponding to the selected first initial corrected video frame for use as a target first-order radial distortion parameter of the to-be-processed video frame.

In the present embodiment, the executing body may determine the candidate first-order radial distortion parameter corresponding to the selected first initial corrected video frame for use as the target first-order radial distortion parameter of the to-be-processed video frame.

The method provided in the above embodiments of the present disclosure may perform distortion correction using each candidate first-order radial distortion parameter, and accurately determine a candidate first-order radial distortion parameter with best distortion correction effect based on the number of straight line segments, for use as a first-order radial distortion parameter of the to-be-processed video frame. This approach may realize real-time and relatively accurate distortion correction on a video without the need for pre-processing, e.g., calibration, of a video frame. A candidate first-order radial distortion parameter with a larger value is limited, such that the candidate first-order radial distortion parameter is more consistent with its usual larger value characteristic, to ensure that the finally obtained target first-order radial distortion parameter is more consistent with the true value.

In some alternative implementations of the present embodiment, the at least local region is a region except for a specified center region in the first initial corrected video frame.

In these alternative implementations, the at least local region is the region except for the specified center region in the first initial corrected video frame. For example, the specified center region may be a rectangular region centered on a center point of an image. A ratio of width to height of the rectangular region may be identical to a ratio of width to height of the first initial corrected video frame. For example, the width of the rectangular region may be one third of the width of the first initial corrected video frame, and the height of the rectangular region may be one third of the height of the first initial corrected video frame.

These implementations may merely use a severely distorted edge region in the first initial corrected video frame as an object to be operated, thereby avoiding the problem that it is time-consuming to detect the full image of the first initial corrected video frame, and improving the distortion correction speed.

In some alternative implementations of the present embodiment, any candidate first-order radial distortion parameters with adjacent values among the plurality of candidate first-order radial distortion parameters are spaced by a first preset interval value; and any candidate second-order radial distortion parameters with adjacent values among the plurality of candidate second-order radial distortion parameters are spaced by a second preset interval value.

In these alternative implementations, an interval between any two adjacent candidate first-order radial distortion parameters may be identical to an interval between other two adjacent candidate first-order radial distortion parameters (there may be or may not be an identical first-order radial distortion parameter to the above any two adjacent candidate first-order radial distortion parameters). An interval between any two adjacent candidate second-order radial distortion parameters may be identical to an interval between other two adjacent candidate second-order radial distortion parameters. The first preset interval value may be identical to or different from the second preset interval value. For example, the first preset interval value may be greater than the second preset interval value.

For example, the first preset interval value may be 0.05, and the candidate first-order radial distortion parameters may include −0.2, −0.15, −0.1, −0.05, and 0.

These implementations may uniformly acquire candidate values, to avoid the inaccuracy of the target first-order radial distortion parameter caused by the non-uniform distribution of candidate values while the true value at a large interval between the candidate values, thereby improving the accuracy of distortion correction.

Figure 3:
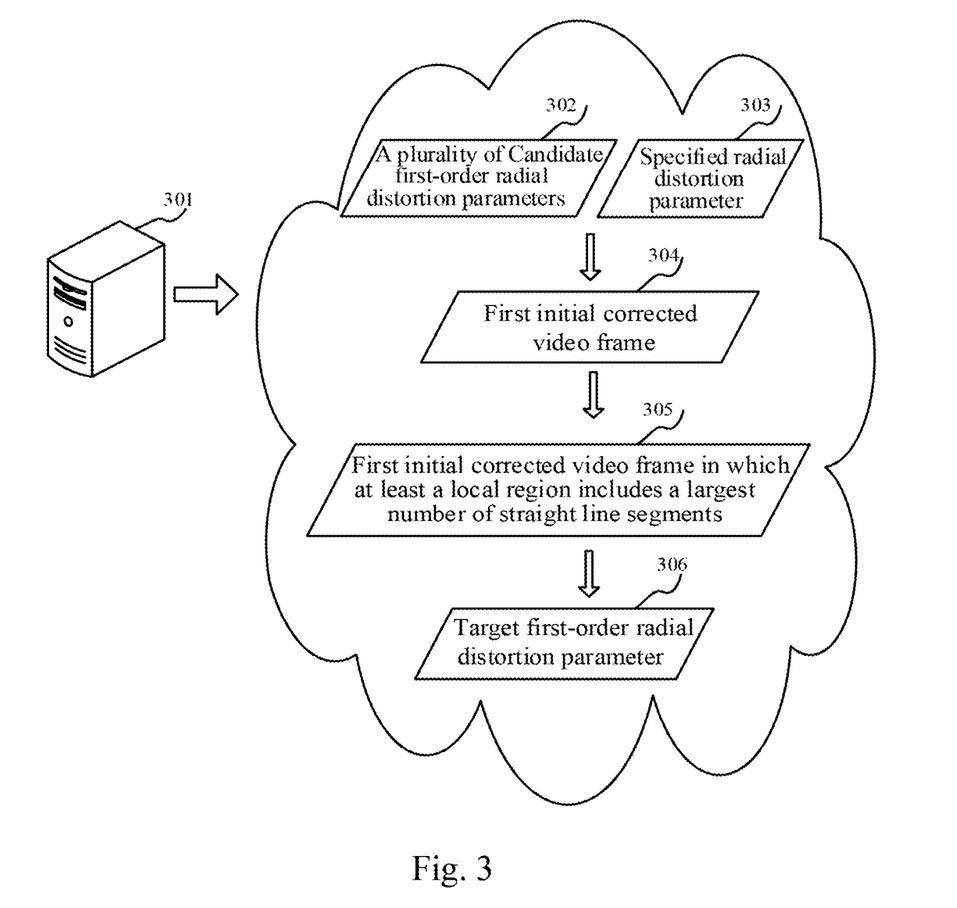
FIG. 3 is a schematic diagram of an application scenario of the method for processing a video frame according to an embodiment of the present disclosure.

Further referring to FIG. 3, FIG. 3 is a schematic diagram of an application scenario of the method for processing a video frame according to the present embodiment. In the application scenario of FIG. 3, an executing body 301 acquires a plurality of candidate first-order radial distortion parameters 302 preset for a to-be-processed video frame, and acquires a specified value 303 of a specified radial distortion parameter except for the first-order radial distortion parameters. Here, an absolute value of the specified value is less than or equal to an absolute value of each of the candidate first-order radial distortion parameters. The executing body 301 performs, for each of the candidate first-order radial distortion parameters, radial distortion correction on the to-be-processed video frame based on the candidate first-order radial distortion parameter 302 and the specified value 303, to obtain a first initial corrected video frame 304. The executing body 301 executes the following selecting steps: selecting, from the first initial corrected video frames, a first initial corrected video frame 305 in which at least a local region includes a largest number of straight line segments, at least a local region corresponding to each of the first initial corrected video frames being consistent. The executing body 301 determines a candidate first-order radial distortion parameter corresponding to the selected first initial corrected video frame for use as a target first-order radial distortion parameter 306 of the to-be-processed video frame.

Figure 4:
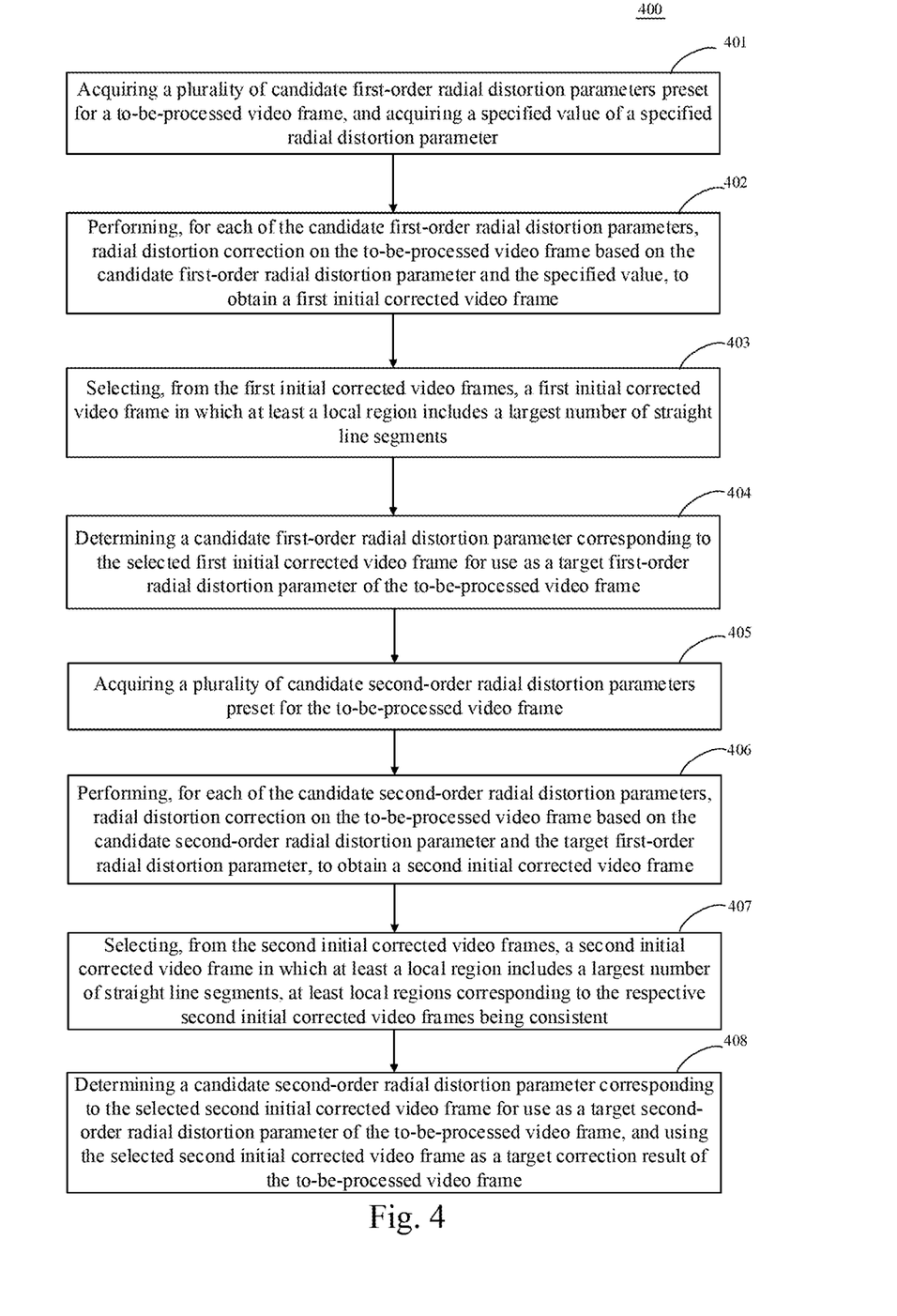
FIG. 4 is a flowchart of the method for processing a video frame according to another embodiment of the present disclosure.

Further referring to FIG. 4, a process 400 of another embodiment of the method for processing a video frame is shown. The process 400 includes the following steps.

Step 401: acquiring a plurality of candidate first-order radial distortion parameters preset for a to-be-processed video frame, and acquiring a specified value of a specified radial distortion parameter, an absolute value of the specified value being less than or equal to an absolute value of each of the candidate first-order radial distortion parameters, the specified radial distortion parameter being a non-first-order radial distortion parameter.

In the present embodiment, an executing body (e.g., the server or the terminal device shown in FIG. 1) on which the method for processing a video frame runs may acquire the plurality of candidate first-order radial distortion parameters (i.e., $k_1$) preset for the to-be-processed video frame. In addition, the executing body may further acquire, for a specified radial distortion parameter other than the first-order radial distortion parameters, a specified value of the specified radial distortion parameter. In practice, the executing body may directly acquire the preset plurality of candidate first-order radial distortion parameters and the specified value locally or from other electronic devices. The to-be-processed video frame here may refer to an original video frame image captured using a camera, or may refer to a video frame obtained by certain processing (e.g., screenshot, or style transformation) of an original video frame image.

Step 402: performing, for each of the candidate first-order radial distortion parameters, radial distortion correction on the to-be-processed video frame based on the candidate first-order radial distortion parameter and the specified value, to obtain a first initial corrected video frame.

In the present embodiment, the executing body may perform, for each candidate first-order radial distortion parameter, radial distortion correction on the to-be-processed video frame based on the candidate first-order radial distortion parameter and the specified value of each specified radial distortion parameter, and the radial distortion correction result is the first initial corrected video frame. In practice, the executing body may use a specified focal length as a radial distortion correction parameter to perform the above radial distortion correction.

Step 403: selecting, from the first initial corrected video frames, a first initial corrected video frame in which at least a local region includes a largest number of straight line segments. At least local regions corresponding to the respective first initial corrected video frames are consistent.

In the present embodiment, the executing body may execute the selecting step, i.e., selecting, from the obtained first initial corrected video frames, the first initial corrected video frame in which the at least local region includes the largest number of straight line segments. The at least local region in the first initial corrected video frame refers to a local region or all regions of the first initial corrected video frame. At least local regions corresponding to different first initial corrected video frames are consistent. The straight line segment here refers to an unbent line segment.

Step 404: determining a candidate first-order radial distortion parameter corresponding to the selected first initial corrected video frame for use as a target first-order radial distortion parameter of the to-be-processed video frame.

In the present embodiment, the executing body may determine the candidate first-order radial distortion parameter corresponding to the selected first initial corrected video frame for use as the target first-order radial distortion parameter of the to-be-processed video frame.

Step 405: acquiring a plurality of candidate second-order radial distortion parameters preset for the to-be-processed video frame, where a largest one of the candidate second-order radial distortion parameters is less than a largest one of the candidate first-order radial distortion parameters.

In the present embodiment, the specified radial distortion parameter includes a second-order radial distortion parameter, and the executing body may determine the second-order radial distortion parameter by an approach like the approach of determining the first-order radial distortion parameter. Specifically, the executing body may acquire a plurality of preset candidate second-order radial distortion parameters. In practice, the second-order radial distortion parameters tend to be small, so generally small values may be assigned to the second-order radial distortion parameters. For example, a maximum value assigned to the first-order radial distortion parameter is 0.2, and a maximum value assigned to the second-order radial distortion parameter may be 0.1 or 0.05.

Step 406: performing, for each of the candidate second-order radial distortion parameters, radial distortion correction on the to-be-processed video frame based on the candidate second-order radial distortion parameter and the target first-order radial distortion parameter, to obtain a second initial corrected video frame.

In the present embodiment, the executing body may perform, for each of the candidate second-order radial distortion parameters, radial distortion correction on the to-be-processed video frame based on the candidate second-order radial distortion parameter and the target first-order radial distortion parameter, and use the radial distortion correction result here as the second initial corrected video frame.

Step 407: selecting, from the second initial corrected video frames, a second initial corrected video frame in which at least a local region includes a largest number of straight line segments. Here, at least local regions corresponding to respective second initial corrected video frames are consistent.

In the present embodiment, the executing body may execute the selecting step on the second initial corrected video frames obtained in step 406, i.e., selecting, from the second initial corrected video frames, a second initial corrected video frame corresponding to best distortion correction effect based on the number of straight line segments included in the at least local region.

Step 408: determining a candidate second-order radial distortion parameter corresponding to the selected second initial corrected video frame for use as a target second-order radial distortion parameter of the to-be-processed video frame, and using the selected second initial corrected video frame as a target correction result of the to-be-processed video frame.

In the present embodiment, the executing body may determine the candidate second-order radial distortion parameter corresponding to the second initial corrected video frame selected in this selecting step for use as the target second-order radial distortion parameter of the to-be-processed video frame. The executing body may use the second initial corrected video frame selected here as the target correction result of the to-be-processed video frame.

The present embodiment may determine the distortion correction results corresponding to the candidate second-order radial distortion parameters respectively using the target first-order radial distortion parameter, to select best distortion correction result therefrom, and then determine a second-order radial distortion parameter most consistent with the true value.

In some alternative implementations of the present embodiment, the to-be-processed video frame includes at least two to-be-processed video frames, a difference in shooting time of any two videos with adjacent shooting time among the at least two to-be-processed video frames is less than or equal to a preset time difference. The method further includes: inputting the at least two to-be-processed video frames and a specified initial focal length of each of the to-be-processed video frames into a structure from motion module to obtain a target focal length of each to-be-processed video frame among the at least two to-be-processed video frames, where the larger the width of a to-be-processed video frame among the at least two to-be-processed video frames is, the larger the specified initial focal length of the to-be-processed video frame is. The performing, for each of the candidate first-order radial distortion parameters, radial distortion correction on the to-be-processed video frame based on the candidate first-order radial distortion parameter and the specified value, to obtain the first initial corrected video frame includes: performing, for each of the candidate first-order radial distortion parameters, radial distortion correction on the to-be-processed video frame based on the candidate first-order radial distortion parameter, the specified value, and the target focal length, to obtain the first initial corrected video frame.

In these alternative implementations, the executing body may input the at least two to-be-processed video frames and the specified initial focal lengths of the to-be-processed video frames into the structure from motion (SFM) module, thereby adjusting the specified initial focal lengths using the structure from motion module, to obtain the target focal length. In this way, the executing body may obtain the initial corrected video frame by distortion correction on the to-be-processed video frame based on: the candidate first-order radial distortion parameter, the specified value, and the target focal length.

Specified initial focal lengths of different to-be-processed video frames among the at least two to-be-processed video frames may be identical or different. In practice, the at least two to-be-processed video frames may be video frames captured using the same camera, and thus may be of the same size. The specified initial focal length may be related to the size of the to-be-processed video frame. For example, a ratio of the specified initial focal length to the width or height of the to-be-processed video frame may be a specified value or within the range of a specified value [0.7, 0.9], i.e., the executing body may make a selection as per a preset rule or randomly from the range.

For any to-be-processed video frame, among the at least two to-be-processed video frames, the to-be-processed video frame with shooting time only before or after the to-be-processed video frame is a video frame with adjacent shooting time. The at least two to-be-processed video frames may be consecutive video frames captured using a camera, or may be video frames acquired at intervals of some frames from video frames captured using a camera. For example, 30 frames are captured in 1 second, and one frame is acquired at intervals of 30 frames for use as the to-be-processed video frame. Therefore, the adjacent video frames mean that the shooting time of the at least two to-be-processed video frames is adjacent.

For example, the at least two to-be-processed video frames totally include 3 video frames, and the shooting time is the first frame: 3:08:00, the second frame: 3:08:01, and the third frame: 3:08:02, respectively. The first frame and the second frame are adjacent video frames, and the second frame and the third frame are video frames with adjacent shooting time.

These implementations may accurately determine a focal length of the to-be-processed image using an initial value of the focal length and the structure from motion.

In some alternative implementations of the present embodiment, the to-be-processed video frame is a video frame captured using a target camera with a constant focal length, and the method further includes: acquiring a target video frame captured using the target camera and except for the to-be-processed video frame; and performing radial distortion correction on the target video frame based on the target focal length, the target first-order radial distortion parameter, and the target second-order radial distortion parameter.

In these alternative implementations, the to-be-processed video frame is captured using the target camera, and the camera captures the video frame using the constant focal length. The executing body may perform radial distortion correction on other video frames captured using the target camera based on the first-order radial distortion parameter, the second-order radial distortion parameter, and the target focal length obtained using the to-be-processed video frame. These implementations may acquire parameters for distortion correction using some video frames captured using a camera, and widely apply the parameters to distortion correction of other video frames captured using the camera.

Figure 5:
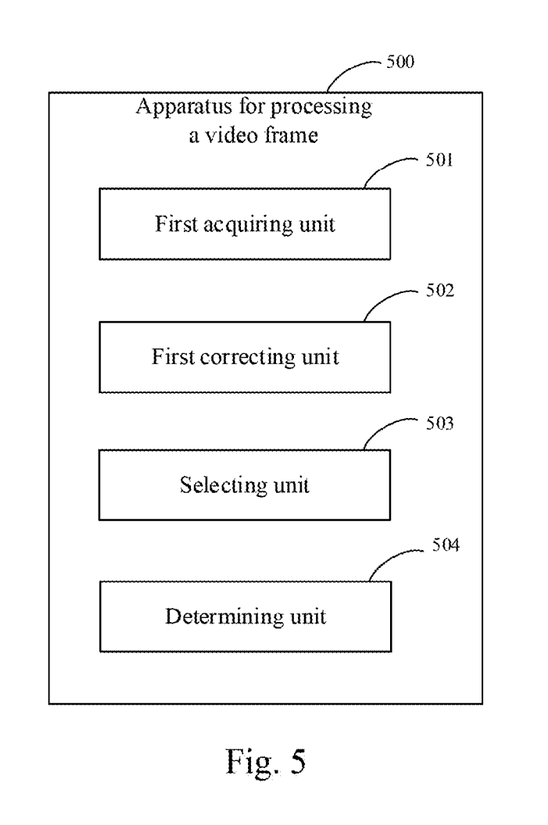
FIG. 5 is a schematic structural diagram of an apparatus for processing a video frame according to an embodiment of the present disclosure.

Further referring to FIG. 5, as an implementation of the method shown in the above figures, an embodiment of the present disclosure provides an apparatus for processing a video frame. The embodiment of the apparatus corresponds to the embodiment of the method shown in FIG. 2. Besides the features disclosed below, the embodiment of the apparatus may further include features or effects identical to or corresponding to the embodiment of the method shown in FIG. 2. The apparatus may be specifically applied to various electronic devices.

As shown in FIG. 5, the apparatus 500 for processing a video frame of the present embodiment includes: a first acquiring unit 501, a first correcting unit 502, a selecting unit 503, and a determining unit 504. The first acquiring unit 501 is configured to acquire a plurality of candidate first-order radial distortion parameters preset for a to-be-processed video frame, and acquire a specified value of a specified radial distortion parameter. An absolute value of the specified value is less than or equal to an absolute value of each of the candidate first-order radial distortion parameters, and the specified radial distortion parameter is a non-first-order radial distortion parameter. The first correcting unit 502 is configured to perform, for each of the candidate first-order radial distortion parameters, radial distortion correction on the to-be-processed video frame based on the candidate first-order radial distortion parameter and the specified value, to obtain a first initial corrected video frame. The selecting unit 503 is configured to select, from the first initial corrected video frames, a first initial corrected video frame in which at least a local region includes a largest number of straight line segments, where at least local regions corresponding to the first initial corrected video frames are consistent. The determining unit 504 is configured to determine a candidate first-order radial distortion parameter corresponding to the selected first initial corrected video frame for use as a target first-order radial distortion parameter of the to-be-processed video frame.

The related description of step 201, step 202, step 203, and step 204 in the corresponding embodiment of FIG. 2 may be referred to for specific processing of the first acquiring unit 501, the first correcting unit 502, the selecting unit 503, and the determining unit 504 of the apparatus 500 for processing a video frame and the technical effects thereof in the present embodiment, respectively. The description will not be repeated here.

In some alternative implementations of the present embodiment, the at least local region is a region except for a specified center region in the initial corrected video frame.

In some alternative implementations of the present embodiment, the specified radial distortion parameter includes a second-order radial distortion parameter, and the apparatus further includes: a second acquiring unit configured to acquire a plurality of candidate second-order radial distortion parameters preset for the to-be-processed video frame, where a largest one of the candidate second-order radial distortion parameters is less than a largest one of the candidate first-order radial distortion parameters; a second correcting unit configured to perform, for each of the candidate second-order radial distortion parameters, radial distortion correction on the to-be-processed video frame based on the candidate second-order radial distortion parameter and the target first-order radial distortion parameter, to obtain a second initial corrected video frame; an initial generating unit configured to select, from the second initial corrected video frames, a second initial corrected video frame in which at least a local region includes a largest number of straight line segments, where at least local regions corresponding to the second initial corrected video frames are consistent; and an executing unit configured to determine a candidate second-order radial distortion parameter corresponding to the selected second initial corrected video frame for use as a target second-order radial distortion parameter of the to-be-processed video frame, and use the selected second initial corrected video frame as a target correction result of the to-be-processed video frame.

In some alternative implementations of the present embodiment, the to-be-processed video frame includes at least two to-be-processed video frames, a difference in shooting time of any two videos with adjacent shooting time among the at least two to-be-processed video frames is less than or equal to a preset time difference. The apparatus further includes: a focal length determining unit configured to input the at least two to-be-processed video frames and a specified initial focal length of each of the to-be-processed video frames into a structure from motion module to obtain a target focal length of each to-be-processed video frame among the at least two to-be-processed video frames, where the larger the width of a to-be-processed video frame among the at least two to-be-processed video frames is, the larger the specified initial focal length of the to-be-processed video frame is; and the first correcting unit is further configured to perform, for each of the candidate first-order radial distortion parameters, radial distortion correction on the to-be-processed video frame based on the candidate first-order radial distortion parameter and the specified value, to obtain a first initial corrected video frame as follows: performing, for each of the candidate first-order radial distortion parameters, radial distortion correction on the to-be-processed video frame based on the candidate first-order radial distortion parameter, the specified value, and the target focal length, to obtain the first initial corrected video frame.

In some alternative implementations of the present embodiment, the to-be-processed video frame is a video frame captured using a target camera with a constant focal length, and the apparatus further includes: a video frame acquiring unit configured to acquire a target video frame captured using the target camera and except for the to-be-processed video frame; and a third correcting unit configured to perform radial distortion correction on the target video frame based on the target focal length, the target first-order radial distortion parameter, and the target second-order radial distortion parameter.

In some alternative implementations of the present embodiment, any candidate first-order radial distortion parameters with adjacent values among the plurality of candidate first-order radial distortion parameters are spaced by a first preset interval value; and any candidate second-order radial distortion parameters with adjacent values among the plurality of candidate second-order radial distortion parameters are spaced by a second preset interval value.

According to the solution of embodiments of the present disclosure, distortion correction may be performed using each candidate first-order radial distortion parameter, and a candidate first-order radial distortion parameter with best distortion correction effect may be accurately determined based on the number of straight line segments, for use as a first-order radial distortion parameter of the to-be-processed video frame. This approach can realize real-time and relatively accurate distortion correction on a video without the need for pre-processing, e.g., calibration, of a video frame. A candidate first-order radial distortion parameter with a larger value is limited, such that the candidate first-order radial distortion parameter is more consistent with its usual larger value characteristic, to ensure that the finally obtained target first-order radial distortion parameter is more consistent with the true value.

Embodiments of the present disclosure further provides an electronic device and a readable storage medium.

Figure 6:
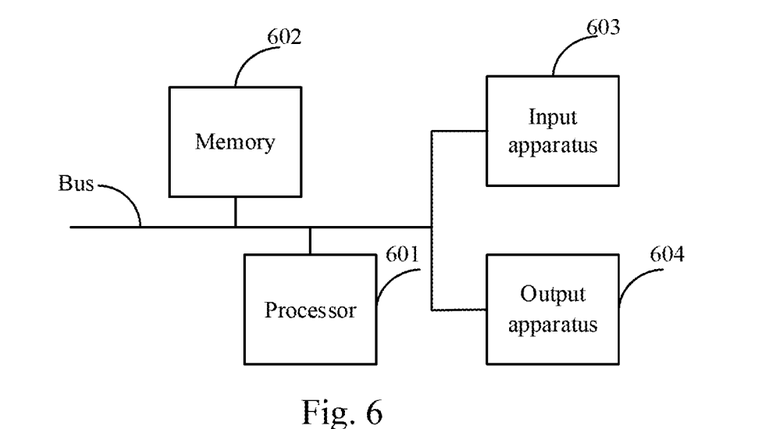
FIG. 6 is a block diagram of an electronic device configured to implement the method for processing a video frame of embodiments of the present disclosure.

As shown in FIG. 6, which is a block diagram of an electronic device of a method for processing a video frame according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 6, the electronic device includes: one or more processors 601, a memory 602, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 6, one processor 601 is used as an example.

The memory 602 is a non-transitory computer readable storage medium provided by an embodiment of the present disclosure. The memory stores instructions executable by at least one processor, so that the at least one processor performs the method for processing a video frame provided by an embodiment of the present disclosure. The non-transitory computer readable storage medium of an embodiment of the present disclosure stores computer instructions for causing a computer to perform the method for processing a video frame provided by the embodiment of the present disclosure.

The memory 602, as a non-transitory computer readable storage medium, may be used to store non-transitory software programs, non-transitory computer executable programs and modules, such as program instructions/modules corresponding to the method for processing a video frame in the embodiments of the present disclosure (for example, the first acquiring unit 501, the first correcting unit 502, and the selecting unit 503 shown in FIG. 5). The processor 601 executes the non-transitory software programs, instructions, and modules stored in the memory 602 to execute various functional applications and data processing of the server, that is, to implement the method for processing a video frame in the foregoing method embodiment.

The memory 602 may include a storage program area and a storage data area, where the storage program area may store an operating system and at least one function required application program; and the storage data area may store data created by the use of the electronic device according to the method for processing parking, etc. In addition, the memory 602 may include a high-speed random access memory, and may also include a non-transitory memory, such as at least one magnetic disk storage device, a flash memory device, or other non-transitory solid-state storage devices. In some embodiments, the memory 602 may optionally include memories remotely provided with respect to the processor 601, and these remote memories may be connected to the electronic device of the method for processing parking through a network. Examples of the above network include but are not limited to the Internet, intranet, local area network, mobile communication network, and combinations thereof.

The electronic device of the method for processing a video frame may further include: an input apparatus 603 and an output apparatus 604. The processor 601, the memory 602, the input apparatus 603, and the output apparatus 604 may be connected through a bus or in other methods. In FIG. 6, connection through a bus is used as an example.

The input apparatus 603 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

Flowcharts and block diagrams in the drawings illustrate architectures, functionalities, and operations of possible implementations of systems, methods, and computer program products in accordance with various embodiments of the present disclosure. In this regard, each block in a flowchart or block diagram may represent a module, program segment, or portion of code that contains one or more executable instructions for implementing a specified logical functionality. It should also be noted that in some alternative implementations, the functionalities noted in the blocks may also occur in an order different from that noted in the drawings. For example, two successively represented blocks may actually be executed substantially in parallel, and they may sometimes be executed in the reverse order, depending on the functionality involved. It is also noted that each block of the block diagrams and/or flowcharts, and combinations of blocks in the block diagrams and/or flowcharts, may be implemented with a dedicated hardware-based system that performs the specified functions or operations, or may be implemented with a combination of dedicated hardware and computer instructions.

The units involved in embodiments of the present disclosure may be implemented by software, or may be implemented by hardware. The described units may also be provided in a processor, for example, described as: a processor including a first acquiring unit, a first correcting unit, a selecting unit, and a determining unit. In some cases, the names of these units do not constitute a limitation to such units themselves. For example, the determining unit may also be described as "a unit configured to determine a candidate first-order radial distortion parameter corresponding to the selected first initial corrected video frame for use as a target first-order radial distortion parameter of the to-be-processed video frame."

In another aspect, the present disclosure further provides a computer-readable medium. The computer-readable medium may be included in the apparatus described in the above embodiments, or a stand-alone computer-readable medium without being assembled into the apparatus. The computer-readable medium carries one or more programs. The one or more programs, when executed by the apparatus, cause the apparatus to: acquire a plurality of candidate first-order radial distortion parameters preset for a to-be-processed video frame, and acquire a specified value of a specified radial distortion parameter, an absolute value of the specified value being less than or equal to an absolute value of each of the candidate first-order radial distortion parameters, the specified radial distortion parameter being a non-first-order radial distortion parameter; perform, for each of the candidate first-order radial distortion parameters, radial distortion correction on the to-be-processed video frame based on the candidate first-order radial distortion parameter and the specified value, to obtain a first initial corrected video frame; select, from the first initial corrected video frames, a first initial corrected video frame in which at least a local region includes a largest number of straight line segments, at least a local region corresponding to each of the first initial corrected video frames being consistent; and determine a candidate first-order radial distortion parameter corresponding to the selected first initial corrected video frame for use as a target first-order radial distortion parameter of the to-be-processed video frame.

The above description is an example embodiment of the disclosure and a description of the technical principles employed. It should be understood by those skilled in the art that the scope of the invention referred to in this disclosure is not limited to the technical solutions formed by specific combinations of the above-mentioned technical features, but also covers other technical solutions formed by any combination of the above-mentioned technical features or equivalents thereof without departing from the inventive concept. For example, the above-mentioned features and the technical features having similar functionalities disclosed in the present disclosure are replaced with each other.

What is claimed is:

1. A method for processing a video frame, comprising:
    acquiring a plurality of candidate first-order radial distortion parameters preset for a to-be-processed video frame, and acquiring a specified value of a specified radial distortion parameter, wherein an absolute value of the specified value is less than or equal to an absolute value of each of the candidate first-order radial distortion parameters, and the specified radial distortion parameter is a non-first-order radial distortion parameter;
    performing, for each of the candidate first-order radial distortion parameters, radial distortion correction on the to-be-processed video frame based on the each candidate first-order radial distortion parameter and the specified value, to obtain a first initial corrected video frame;
    selecting, from the first initial corrected video frames, a first initial corrected video frame in which at least a local region comprises a largest number of straight line segments, wherein at least local regions corresponding to the first initial corrected video frames are consistent; and
    determining a candidate first-order radial distortion parameter corresponding to the selected first initial corrected video frame for use as a target first-order radial distortion parameter of the to-be-processed video frame.

2. The method according to claim 1, wherein the at least local region is a region except for a specified center region in the first initial corrected video frame.

3. The method according to claim 1, wherein the specified radial distortion parameter comprises a second-order radial distortion parameter, and the method further comprises:
    acquiring a plurality of candidate second-order radial distortion parameters preset for the to-be-processed video frame, wherein a largest one of the candidate second-order radial distortion parameters is less than a largest one of the candidate first-order radial distortion parameters;
    performing, for each of the candidate second-order radial distortion parameters, radial distortion correction on the to-be-processed video frame based on the each candidate second-order radial distortion parameter and the target first-order radial distortion parameter, to obtain a second initial corrected video frame;
    selecting, from the second initial corrected video frames, a second initial corrected video frame in which at least a local region comprises a largest number of straight line segments, wherein at least local regions corresponding to the second initial corrected video frames are consistent; and
    determining a candidate second-order radial distortion parameter corresponding to the selected second initial corrected video frame for use as a target second-order radial distortion parameter of the to-be-processed video frame, and using the selected second initial corrected video frame as a target correction result of the to-be-processed video frame.

4. The method according to claim 3, wherein the to-be-processed video frame comprises at least two to-be-processed video frames, and a difference in shooting time of any two videos with adjacent shooting time among the at least two to-be-processed video frames is less than or equal to a preset time difference;
    the method further comprises:
    obtaining a target focal length of each to-be-processed video frame among the at least two to-be-processed video frames based on the at least two to-be-processed video frames and a specified initial focal length of each of the to-be-processed video frames by using a structure from motion (SFM) method, wherein the larger the width of a to-be-processed video frame among the at least two to-be-processed video frames is, the larger the specified initial focal length of the to-be-processed video frame is; and
    performing, for each of the candidate first-order radial distortion parameters, radial distortion correction on the to-be-processed video frame based on the each candidate first-order radial distortion parameter and the specified value, to obtain the first initial corrected video frame comprises:
    performing, for each of the candidate first-order radial distortion parameters, radial distortion correction on the to-be-processed video frame based on the each candidate first-order radial distortion parameter, the specified value, and the target focal length, to obtain the first initial corrected video frame.

5. The method according to claim 4, wherein the to-be-processed video frame is a video frame captured using a target camera with a constant focal length, and the method further comprises:
    acquiring a target video frame captured using the target camera, wherein the target video frame does not comprise the to-be-processed video frame; and
    performing radial distortion correction on the target video frame based on the target focal length, the target first-order radial distortion parameter, and the target second-order radial distortion parameter.

6. The method according to claim 1, wherein any candidate first-order radial distortion parameters with adjacent values among the plurality of candidate first-order radial distortion parameters are spaced by a first preset interval value; and any candidate second-order radial distortion parameters with adjacent values among the plurality of candidate second-order radial distortion parameters are spaced by a second preset interval value.

7. An electronic device, comprising:
one or more processors; and
a memory storing apparatus configured to store one or more programs,
wherein the one or more programs, when executed by the one or more processors, cause the one or more processors to perform operations, the operations comprising:
acquiring a plurality of candidate first-order radial distortion parameters preset for a to-be-processed video frame, and acquiring a specified value of a specified radial distortion parameter, wherein an absolute value of the specified value is less than or equal to an absolute value of each of the candidate first-order radial distortion parameters, and the specified radial distortion parameter is a non-first-order radial distortion parameter;
performing, for each of the candidate first-order radial distortion parameters, radial distortion correction on the to-be-processed video frame based on the each candidate first-order radial distortion parameter and the specified value, to obtain a first initial corrected video frame;
selecting, from the first initial corrected video frames, a first initial corrected video frame in which at least a local region comprises a largest number of straight line segments, wherein at least local regions corresponding to the first initial corrected video frames are consistent; and
determining a candidate first-order radial distortion parameter corresponding to the selected first initial corrected video frame for use as a target first-order radial distortion parameter of the to-be-processed video frame.

8. The electronic device according to claim 7, wherein the at least local region is a region except for a specified center region in the first initial corrected video frame.

9. The electronic device according to claim 7, wherein the specified radial distortion parameter comprises a second-order radial distortion parameter, and the operations further comprise:

acquiring a plurality of candidate second-order radial distortion parameters preset for the to-be-processed video frame, wherein a largest one of the candidate second-order radial distortion parameters is less than a largest one of the candidate first-order radial distortion parameters;
performing, for each of the candidate second-order radial distortion parameters, radial distortion correction on the to-be-processed video frame based on the each candidate second-order radial distortion parameter and the target first-order radial distortion parameter, to obtain a second initial corrected video frame;
selecting, from the second initial corrected video frames, a second initial corrected video frame in which at least a local region comprises a largest number of straight line segments, wherein at least local regions corresponding to the second initial corrected video frames are consistent; and
determining a candidate second-order radial distortion parameter corresponding to the selected second initial corrected video frame for use as a target second-order radial distortion parameter of the to-be-processed video frame, and using the selected second initial corrected video frame as a target correction result of the to-be-processed video frame.

10. The electronic device according to claim 9, wherein the to-be-processed video frame comprises at least two to-be-processed video frames, and a difference in shooting time of any two videos with adjacent shooting time among the at least two to-be-processed video frames is less than or equal to a preset time difference;
the operations further comprise:
obtaining a target focal length of each to-be-processed video frame among the at least two to-be-processed video frames based on the at least two to-be-processed video frames and a specified initial focal length of each of the to-be-processed video frames by using a structure from motion (SFM) method, wherein the larger the width of a to-be-processed video frame among the at least two to-be-processed video frames is, the larger the specified initial focal length of the to-be-processed video frame is; and
performing, for each of the candidate first-order radial distortion parameters, radial distortion correction on the to-be-processed video frame based on the each candidate first-order radial distortion parameter and the specified value, to obtain the first initial corrected video frame comprises:
performing, for each of the candidate first-order radial distortion parameters, radial distortion correction on the to-be-processed video frame based on the each candidate first-order radial distortion parameter, the specified value, and the target focal length, to obtain the first initial corrected video frame.

11. The electronic device according to claim 10, wherein the to-be-processed video frame is a video frame captured using a target camera with a constant focal length, and the operations further comprise:
acquiring a target video frame captured using the target camera, wherein the target video frame does not comprise the to-be-processed video frame; and
performing radial distortion correction on the target video frame based on the target focal length, the target first-order radial distortion parameter, and the target second-order radial distortion parameter.

12. The electronic device according to claim 7, wherein any candidate first-order radial distortion parameters with adjacent values among the plurality of candidate first-order radial distortion parameters are spaced by a first preset interval value; and
any candidate second-order radial distortion parameters with adjacent values among the plurality of candidate second-order radial distortion parameters are spaced by a second preset interval value.

13. A non-transitory computer-readable storage medium, storing a computer program thereon, wherein the program, when executed by a processor, causes the o processor to perform operations, the operations comprising:
acquiring a plurality of candidate first-order radial distortion parameters preset for a to-be-processed video frame, and acquiring a specified value of a specified radial distortion parameter, wherein an absolute value of the specified value is less than or equal to an absolute value of each of the candidate first-order radial distortion parameters, and the specified radial distortion parameter is a non-first-order radial distortion parameter;

performing, for each of the candidate first-order radial distortion parameters, radial distortion correction on the to-be-processed video frame based on the each candidate first-order radial distortion parameter and the specified value, to obtain a first initial corrected video frame;

selecting, from the first initial corrected video frames, a first initial corrected video frame in which at least a local region comprises a largest number of straight line segments, wherein at least local regions corresponding to the first initial corrected video frames are consistent; and determining a candidate first-order radial distortion parameter corresponding to the selected first initial corrected video frame for use as a target first-order radial distortion parameter of the to-be-processed video frame.

14. The non-transitory computer-readable storage medium according to claim 13, wherein the at least local region is a region except for a specified center region in the first initial corrected video frame.

15. The non-transitory computer-readable storage medium according to claim 13, wherein the specified radial distortion parameter comprises a second-order radial distortion parameter, and the operations further comprise:

acquiring a plurality of candidate second-order radial distortion parameters preset for the to-be-processed video frame, wherein a largest one of the candidate second-order radial distortion parameters is less than a largest one of the candidate first-order radial distortion parameters;

performing, for each of the candidate second-order radial distortion parameters, radial distortion correction on the to-be-processed video frame based on the each candidate second-order radial distortion parameter and the target first-order radial distortion parameter, to obtain a second initial corrected video frame;

selecting, from the second initial corrected video frames, a second initial corrected video frame in which at least a local region comprises a largest number of straight line segments, wherein at least local regions corresponding to the second initial corrected video frames are consistent; and determining a candidate second-order radial distortion parameter corresponding to the selected second initial corrected video frame for use as a target second-order radial distortion parameter of the to-be-processed video frame, and using the selected second initial corrected video frame as a target correction result of the to-be-processed video frame.

16. The non-transitory computer-readable storage medium according to claim 15, wherein the to-be-processed video frame comprises at least two to-be-processed video frames, and a difference in shooting time of any two videos with adjacent shooting time among the at least two to-be-processed video frames is less than or equal to a preset time difference;

the operations further comprise:

obtaining a target focal length of each to-be-processed video frame among the at least two to-be-processed video frames based on the at least two to-be-processed video frames and a specified initial focal length of each of the to-be-processed video frames by using a structure from motion (SFM) method, wherein the larger the width of a to-be-processed video frame among the at least two to-be-processed video frames is, the larger the specified initial focal length of the to-be-processed video frame is; and performing, for each of the candidate first-order radial distortion parameters, radial distortion correction on the to-be-processed video frame based on the each candidate first-order radial distortion parameter and the specified value, to obtain the first initial corrected video frame comprises:

performing, for each of the candidate first-order radial distortion parameters, radial distortion correction on the to-be-processed video frame based on the each candidate first-order radial distortion parameter, the specified value, and the target focal length, to obtain the first initial corrected video frame.

17. The non-transitory computer-readable storage medium according to claim 16, wherein the to-be-processed video frame is a video frame captured using a target camera with a constant focal length, and the operations further comprise:

acquiring a target video frame captured using the target camera, wherein the target video frame does not comprise the to-be-processed video frame; and performing radial distortion correction on the target video frame based on the target focal length, the target first-order radial distortion parameter, and the target second-order radial distortion parameter.

18. The non-transitory computer-readable storage medium according to claim 13, wherein any candidate first-order radial distortion parameters with adjacent values among the plurality of candidate first-order radial distortion parameters are spaced by a first preset interval value; and any candidate second-order radial distortion parameters with adjacent values among the plurality of candidate second-order radial distortion parameters are spaced by a second preset interval value.

* * * * *